Feb. 15, 1972    K. W. RAUSCH, JR., ET AL    3,642,964
CONTINUOUS PROCESS FOR THE ONE-SHOT PREPARATION OF
A THERMOPLASTIC NON-CELLULAR POLYURETHANE
Filed Dec. 3, 1969

```
                    ┌──────────────┐
                    │  EXTRUSION   │ ──→ TO PRODUCT
                    │    ZONE      │     COLLECTION
                    ├──────────────┤     ZONE
                    │     MIX      │
                    │    ZONE      │
                    ├──────────────┤
          ┌───┐     │    FEED      │
          │ B │ ──→ │    ZONE      │
          └───┘     └──────────────┘
   ┌───┐
   │ A │ ──────────→
   └───┘
```

INVENTORS
KARL W. RAUSCH, JR
THOMAS R. MC CLELLAN

United States Patent Office 3,642,964
Patented Feb. 15, 1972

3,642,964
CONTINUOUS PROCESS FOR THE ONE-SHOT PREPARATION OF A THERMOPLASTIC NON-CELLULAR POLYURETHANE
Karl W. Rausch, Jr., Hamden, Conn., and Thomas R. McClellan, Rosmalen, Netherlands, assignors to The Upjohn Company, Kalamazoo, Mich.
Filed Dec. 3, 1969, Ser. No. 881,758
Int. Cl. B29f 3/08; C08g 22/04
U.S. Cl. 264—40
8 Claims

ABSTRACT OF THE DISCLOSURE

A continuous preparation of thermoplastic noncellular polyurethanes is disclosed. The reaction components are mixed in the liquid state and passed through a high shear mixing zone and then through an extrusion zone. The temperature of the reaction mixture is controlled during passage through the mixer and extruder in such a manner that the viscosity of the reaction mixture remains substantially constant throughout the mixing and extrusion zones; this requires a temperature gradient in the various zones rising from a low of about 200° F. at mixing to about 400–450° F. at the point of extrusion. In a preferred embodiment the reaction is carried out in a combination of high shear mixer and twin-screw extruder. The thermoplastic polyurethane is preferably extruded as a strand which is cooled below its melting point and pelletized.

BACKGROUND OF THE INVENTION

The preparation of thermoplastic noncellular polyurethanes using a batch type procedure with either a one-shot or a prepolymer technique is well known in the art. This type of polyurethane is currently in considerable demand for the preparation of shaped plastic objects by extrusion or by injection molding. In the latter procedure the polyurethane, generally in the form of granules or pellets, is melted and fed under pressure to a mold in which the desired article is shaped under heat and pressure conditions.

In the batch procedures mentioned above, the polyurethane-forming reactants, normally an organic diisocyanate, a polyester or polyether polyol, and a chain-extender such as an aliphatic diol, an aminoalkanol, or a primary diamine, are brought together in a suitable vessel. In the one-shot procedure the diisocyanate, the polyol, and the chain extender are brought together in a single operation (the polyol and chain extender can be preblended if desired). In the prepolymer procedure the diisocyanate is reacted with part, or the whole, of the polyol in a first step, and the isocyanate-terminated prepolymer so obtained is reacted with the chain extender in a separate, subsequent step.

In the manufacturing procedures currently used in the art, the preparation of the polyurethane elastomer is carried out, either in a one-shot or a prepolymer procedure, on a batch basis and the resulting polyurethane is cast in a closed mold, generally in the form of a sheet. The resulting cast elastomer is then broken up, for example, by chopping into small particles which are subsequently used for injection molding or extrusion to prepare finished products. If desired, the cast particulate material can be subjecting to homogenization by melting and extruding in the form of strands. The strands are cut into pellets which are then used for extrusion or injection molding in the same manner as the untreated particulate material. Such a homogenizing procedure is described in U.S. Pat. No. 3,192,185.

The use of the above type batch procedure, involving the intermediate step of casting and comminution of the cast material, is cumbersome and unattractive for the large scale production of polyurethane elastomers. Attempts to devise a continuous process for the preparation of these materials have been reported in the literature.

Illustratively, U.S. Pat. 3,233,025 describes the preparation of a polyurethane elastomer by admixing the polyurethane forming reactants for a brief period (30 to 45 seconds) followed by pouring the mixture directly into the feed section of an extruder. Shaped elastomer is removed from the extruder and pelletized. One of the critical requirements of the process in question is said to be that the residence time in the extruder is less than that required for complete reaction of all the isocyanate present in the reaction mixture. The product obtained, accordingly, contains free isocyanate groups and is essentially a "greenstock" rather than a cured elastomer, i.e. further reaction of the free isocyanate, as by reaction with atmospheric moisture is possible and, indeed, necessary to effect curing. Further, the requirement that the mixed reactants be poured, or otherwise transferred, into the extruder places a severe limitation on the rate at which the reaction can be catalyzed; fast catalysis would give rise to the danger of solidification, or production of a high viscosity fluid, during the mixing stage and this could hinder or prohibit the required transfer.

We have now found that it is possible to carry out the proluction of thermoplastic polyurethane elastomers, in which the polyurethane forming reaction has proceeded to completion, by means of a continuous operation in which the polyurethane forming reactants are fed in liquid form to a unitary combination of reactor and extruder and are recovered therefrom as shaped elastomer. The processing conditions required to achieve this result are highly critical as will be seen from the description given below. We have also found that polyurethane elastomers prepared in accordance with the process of this invention possess properties which are superior to those of polyurethanes prepared from the same ingredients but using the noncontinuous procedures hitherto employed in the art.

SUMMARY OF THE INVENTION

The present invention, in its broadest aspect, comprises a continuous process for the preparation of a thermoplastic noncellular polyurethane, said process comprising the steps of:

(a) Admixing, in the liquid state in a first zone, an organic diisocyanate, a polymeric diol, a difunctional extender, and a catalyst, the overall ratio of isocyanate to active hydrogen groups in said reactants being within the range of about 0.9:1 to about 1.2:1, and the molar proportion of polymeric diol to difunctional extender being within the range of about 0.1:1 to about 10:1;

(b) Continuously passing reaction mixture from said first zone through a second zone in which said reaction mixture is subjected to high shear mixing;

(c) Continuously passing reaction mixture from said second zone to a shaping zone in which said mixture is shaped by extrusion; and (d) Controlling the temperature of said reaction mixture during its passage through each of said zones so that the viscosity of said reaction mixture remains substantially constant throughout said zones and falls within the range of about 100,000 cps. to about 1,000,000 cps.

The present invention also comprises the noncellular polyurethanes prepared in accordance with the process of the invention.

BRIEF DESCRIPTION OF THE DRAWING

FIG. 1 shows in schematic form a specific embodiment of the process of the invention.

DETAILED DESCRIPTION OF THE INVENTION

The actual polyurethane reaction components employed in the process of the invention are those which, with the possible exception of the catalyt system, are conventionally employed in the art in the preparation of polyurethane elastomers. The novelty of the process of the invention lies in the particular conditions and circumstances under which these reaction components are caused to react, and in the conditions under which the polyurethane reaction product is handled subsequently. Thus, in the process of the invention, the polyurethane reaction components, which comprise an organic diisocyanate, a polymeric diol, a low molecular weight difunctional extender, and a catalyst, all of which are defined and exemplified hereinafter, are brought together in a liquid state, with some preblending of nonreactive components, if desired, and subjected, in successive stages of a unitary reactor having various interconnecting zones, to highly efficient mixing to insure homogeneity followed by extrusion of the resulting polyurethane in whatever shape is desired in the final product.

A number of factors are critical to success in the process of the invention. The principal of such factors, many of which are obviously interrelated, include the rate of catalysis of the reaction mixture, the average residence time within the reactor, the control of temperature throughout the reactor, the maintenance of substantially constant viscosity in the material passing through the reactor, and the overall characteristics of the apparatus in which the process is carried out.

Dealing firstly with the type of apparatus in which the process of the invention is carried out, said apparatus comprises three interconnecting zones, i.e. zones which are so arranged that the exit from one zone leads directly to the entry port of the next zone, there being no pipes, conduits or other means of transporting fluids, interposed between the various zones.

The three interconnecting zones are shown schematically in FIG. 1. In the flow sheet illustrated in FIG. 1, the various polyurethane components are stored in heated storage tanks or the like. Two such storage facilities are shown as A and B in FIG. 1, but it will be appreciated that separate storage facilities are normally provided for each of the various components and the number of storage containers may be any number depending upon the number of components to be stored. Only two such storage areas are shown in FIG. 1 simply as a matter of convenience and simplicity of presentation. The various reaction components are fed as liquids in metered proportions with heating, when required to maintain the liquid state, at temperatures which will be discussed hereinafter, to the initial one of the three zones of the reactor, namely the FEED ZONE.

This ZONE generally comprises a chamber for receiving the various component streams and means within the ZONE for passing the mixed component to the next zone in the series of three zones. The means for passing the mixed components from the FEED ZONE to the next zone can be any pump generally used in the art for quickly transporting relatively viscous liquids. Preferably said pump means takes the form of a screw mounted longitudinally in a barrel so that rotation of said screw about its longitudinal axis imparts a positive forward movement to liquid fed from the receiving chamber of said FEED ZONE and thereby transfers material from said receiving chamber to the entry port of the next zone, namely the MIX ZONE.

The reaction components can be fed to the FEED ZONE in such a manner that the ensuing reaction is essentially a so-called one-shot procedure or, alternatively, the reaction components can be fed in such a manner that the ensuing reaction is essentially a prepolymer reaction. Thus, all the reaction components (separately or with appropriate preblending) can be delivered simultaneously to the entry port of said FEED ZONE thus reproducing the conditions of a typical one-shot procedure. Alternatively, the polyisocyanate component, the polymeric diol component, and the catalyst can be fed simultaneously to the entry port of said FEED ZONE so that formation of an isocyanate-terminated prepolymer is initiated. The extender component is then introduced into the FEED ZONE at the point removed from the entry port of said ZONE or is introduced into the early stages of the MIX ZONE. The extender, when so introduced, is brought into reaction with isocyanate-terminated prepolymer and the reaction then corresponds to a typical prepolymer process known in the art.

The polyurethane reaction mixture transferred from the FEED ZONE to the MIX ZONE, in the manner described above, is subjected in said MIX ZONE to a highly efficient mixing process sufficient to insure complete homogeneity in the reaction mixture during its passage through said zone. As will be discussed in more detail hereafter, the polyurethane forming reaction is taking place during at least the early phase of the residence of the reaction mixture in the MIX ZONE. Unless efficient mixing is in operation during this time, there will be a variation, within the mixture, of proportions of the various reaction components and of concentration of catayst which can lead to inhomogeneous reactions and localized overheating of the reaction mixture particularly in view of the highly exothermic nature of the reaction.

Hence, the type of mixing provided in the MIX ZONE is preferably of a high shear variety. A number of devices which provide this type of mixing are available commercially and can be employed as the MIX ZONE part of the combination shown schematically in FIG. 1. Generally such high shear mixing devices employ a series of broad edged kneading elements mounted on an axle disposed longitudinally in cylindrical barrel. In the most commonly used devices, two series of kneading elements are mounted in intermeshing relationship on a pair of axes mounted in parallel in a cylindrical barrel. The kneading elements in such devices are substantially triangular or elliptical in shape and are each of dimensions such that there is minimal clearance between the inner surface of the barrel and the portions of the perimeter of said elements which are furthest removed from the point of mounting on the axle. Hence, rotation of the axle subjects any fluid within the barrel to high shear forces as and when said fluid becomes caught momentarily between the edges of said kneading elements and the inner wall of the barrel. Further mixing is imparted to fluid within the barrel by the kneading action caused by constant change of path as the fluid is forced through the open spaces between the various kneading elements. Additional mixing and application of high shear force to the fluid can be imparted, if desired, by mounting appropriate baffles, or other projections, from the inner surface of the barrel in the free spaces between the paddles.

Generally speaking the propulsion force imparted to the polyurethane reaction mixture by the pump means in the FEED ZONE, together with forward propulsion imparted to the reaction mixture in the subsequent EXTRUSION ZONE, is sufficient to maintain any desired rate of forward flow of reaction mixture through the MIX ZONE. However, if desired, the mixing means provided in the MIX ZONE can be adapted to impart additional forward propulsion to the reaction mixture during its passage through said zone. For example, it is possible to modify the pitch of the kneading elements employed in a typical mixing means described above so that said element not only imparts high shear forces to the reaction mixture but also imparts forward propulsion thereto.

From the MIX ZONE, the reaction mixture is passed to the final one, namely the EXTRUSION ZONE, of the three inter-connecting zones in FIG. 1. In this zone the reaction mixture is subjected to shaping, to any desired cross-sectional configuration, by extrusion through an appropriate die. Said die can have one extrusion port, or a plurality of extrusion ports depending largely on the capacity of the overall apparatus employed in the three zone reactor. The EXTRUSION ZONE can comprise any extruding apparatus commonly employed in the art of extruding polyurethane elastomers and like thermoplastic polymers. Preferably the EXTRUSION ZONE comprises a twin screw extruder of a capacity appropriate to the capacity of the components used in the other zones of the combination.

As indicated above, the various components which constitute the FEED, MIX, and EXTRUSION ZONES of FIG. 1, can be standard components which are obtained separately and assembled together to form a continuous unitary whole. In general, the method of assembling such units so that the exit port of one unit is aligned with the entrance port of the next unit, etc., presents no difficulty particularly where each of the units is composed of a cylindrical barrel through which the treated fluid is caused to pass since such units can be assembled with the longitudinal axes aligned horizontally.

In a preferred embodiment the FEED, MIX, and EXTRUSION ZONES are composed of a single barrel having a cylindrical interior into which are fitted twin parallel shafts. Said shafts have fabricated thereon, in the appropriate order and location and in interlocking arrangement, the screw threads necessary to form the positive displacement means of the FEED ZONE, the kneading elements necessary to form the MIX ZONE, and the screw threads necessary for the propulsion in the EXTRUSION ZONE. Said multipurpose shafts can be driven from a single power source with appropriate gearing so that the rate of rotation can be adjusted as desired.

In whatever manner the interconnecting FEED, MIX, and EXTRUSION ZONES are fabricated or assembled, they are each provided throughout their lengths with a plurality of individual heating means so that the temperature of the reaction mixture passing through said zones can be controlled incrementally, i.e. for the purposes of controlling the temperature of the reaction mixture as closely as possible, the various ZONES are divided into small sections each of which can be independently heated or cooled as desired. The reasons for this feature will become apparent from the detailed discussion below of the conditions under which the reaction mixture is maintained during its passage through the various zones.

In carrying out the process of the invention in a continuous manner illustrated schematically in FIG. 1, the various reactants, namely the diisocyanate polymeric diol, extender and catalyst are preheated in storage tanks shown as A, B etc. If desired, the polymeric diol and extender can be preblended and maintained in the same storage tank. If further desired, the mixture of polymeric diol and extender can be preblended with the catalyst provided that said components are compatible, i.e. provided that the catalyst does not itself suffer degradation or cause degradation of one or both of the polymeric diol and extender.

The amount of preheating to which the various polyurethane reactants are subjected in the storage tanks A, B etc. is at least sufficient to maintain all of the said reactants, or blends thereof, in the molten state. Advantageously, each of said reactants, or of blends thereof, is heated at a temperature in the range of about 85° F. to about 260° F. and the various reactant streams are maintained at a temperature within this range as they are passed, via metering means, to the receiving chamber in the FEED ZONE. Any suitable metering means known in the art can be employed. Said metering means can be provided with appropriate controls so that the relative proportions of the various reactants, being fed to the FEED ZONE, can be maintained constant throughout the operation of the process.

In general the relative proportions of the various reactants are maintained such that the overall ratio of isocyanate groups to total active hydrogen atoms (i.e. hydrogen atoms which show a positive reaction in the Zerewitinoff reaction; see, for example, J. Am. Chem. Soc. 49, 3181, 1927) in the polymeric diol and extender, is within the range of about 0.9:1 to about 1.2:1 and preferably is of the order of 1:1, and the relative proportion of polymeric diol to extender, expressed in terms of equivalents of these materials is within the range of about 0.1:1 to about 10:1 and is preferably within the range of about 1:1 to about 5:1. As is well recognized in the art, the precise proportion of polymeric diol to extender in any given case is a matter of choice depending on the particular diol and extender employed and on the desired properties of the end product.

After the various reaction components have been fed to the FEED ZONE in the above manner, the temperature of the mixed components is preferably maintained within the above limits while the mixture is being pumped, by the pump means, into the MIX ZONE. The average time taken to transfer material from the receiving chamber of the FEED ZONE to the beginning of the MIX ZONE is advantageously as short as possible, subject to the capacity of the pumping means employed. In the preferred mode of operation of the process of the invention, the average residence time of the reaction mixture in the FEED ZONE is so adjusted that no significant polyurethane-forming reaction occurs until the reaction mixture has entered the MIX ZONE. In the case of any given mixture of reaction components, the time which elapses between the point at which the various reaction components are brought together in the receiving chamber of the FEED ZONE and the point at which polyurethane-forming reaction begins is an easily determined and controllable quantity. The time interval in question is a function of the order of reactivity of the particular active hydrogen containing components with the particular polyisocyanates, of the temperature at which the components are brought together, and of the rate and amount of catalyst employed.

In general the average residence time of the reaction mixture in the FEED ZONE is advantageously of the order of about 1 second to about 6 seconds, and for any given residence time within this range, the start of polyurethane-forming reaction is adjusted, by controlling the various factors discussed above, so that no significant reaction occurs until the reaction component mixture has entered the beginning of the MIX ZONE.

In this connection it should be pointed out that the choice of catalyst and the level of catalyst concentration in carrying out the continuous process of the invention is governed by entirely different considerations than those obtained in the batch procedures hitherto employed in the art. Thus, because of the difficulty of maintaining homogeneity in a viscous reaction in a large reaction vessel such as those used in batch procedures, the rate of catalysis is generally mainly at a low level in the latter. The use of a high rate of catalysis in an inefficiently agitated polyurethane forming reaction promotes the possibility of "hot-spots" in the reaction mixture, i.e. areas within the reaction mixture in which the concentration of catalyst is abnormally high or the proportion of isocyanate to polyol is out of phase. This phenomena can give rise to a product of non-uniform composition as well as create difficulties because of abnormally high exotherm at limited spots in the reaction mixture.

In the case of the process of this invention, however, the use of high rates of catalysis is permissible because of the extreme efficiency of the mixing in the MIX ZONE. The use of high rate of catalysis is highly advantageous since the overall reaction time in the continuous process of the invention is reduced to a matter of minutes compared with the several hours required for completion of reaction in the batch procedures hitherto employed because of the low rate of catalysis necessitated by such procedures. The economic advantages flowing from this difference in reaction rate between the continuous and batch procedures will be obvious to one skilled in the art.

The desired high rate of catalysis in the process of the invention can be achieved either by appropriate choice of the catalyst or by increasing the level of catalyst over that normally used in the art. Thus, the catalysts which can be employed in the process of the invention for any particular system, at levels within the range of about 0.001 percent to about 1.0 percent by weight of polyisocyanate, are any of the compounds, known in the art to catalyze the reaction between an isocyanate group and an active hydrogen containing compound, which will give a pot life of less than about 10 seconds in the particular polyurethane-forming system to be employed in the continuous process of the invention. As will be apparent to one skilled in the art, catalysts exhibiting the required pot life in any given system can be selected readily by routine experimentation from the catalysts known in the art. The latter are summarized, for example, in Saunders et al., Polyurethanes, Chemistry and Technology, vol. I, pages 227-232, Interscience Publishers, New York, 1964 and in Britain et al., J. Applied Polymer Science, 4, 207-211, 1960. Preferably the catalyst employed in the process of the invention is one of the class comprising tin and lead salts of fatty acids. The most preferred catalyst is stannous octoate.

As discussed above, the catalyst and the level of concentration of catalyst, in the reaction mixture is so chosen that (1) no significant reaction takes place until the polyurethane reaction mixture reaches the beginning of the MIX ZONE in the process of the invention and (2) the polyurethane reaction is substantially complete at the point at which the reaction mixture leaves the MIX ZONE. The latter point is obviously governed by the residence time of the mixture in the MIX ZONE. Advantageously, the average residence time of the mixture in the MIX ZONE is from about 6 seconds to about 50 seconds and preferably is within the range of about 12 seconds to about 30 seconds.

The polyurethane reaction which commences in said MIX ZONE is highly exothermic and it is necessary to apply cooling to the particular area of said MIX ZONE in which the greatest exotherm manifests itself. Advantageously, the temperature of the reaction mixture at this point is maintained below about 500° F. by cooling and preferably is maintained within the range of about 390° F. to about 480° F.

Not only is the control of the temperature of the reaction mixture during the period of exotherm critical but the control of the temperature of the reaction mixture through the continuous reactor is equally critical. Thus, we have found that it is essential to adjust the temperature of the reaction mixture at any given point in its passage through said reactor in such a way that the viscosity of said reaction mixture at said point is substantially the same as the viscosity at any other given point in the reactor. Thus, in the absence of any attempt to control the temperature of the reaction mixture, the variation in viscosity of the reaction mixture, as the reaction progressed, would be tremendous. After the period of exotherm, at which the temperature rises, the reaction mixture shows a very dramatic increase in viscosity, and, in the absence of any controlling forces, the product solidifies. Such variation in viscosity at various points in the reactor would render continued operation of the reactor difficult, if not impossible, particularly when solidification occurs.

Accordingly, we have found that it is essential to maintain the viscosity of the reaction mixture substantially constant, i.e. within clearly defined limits, during its passage through the continuous reactor. Thus, we have found that the viscosity of said mixture should be maintained throughout the reactor at a value within the range of about 100,000 cps. to about 1,000,000 cps. This can be done by controlling the temperature of the reaction mixture using the multiplicity of incremental heating or cooling units in the barrel of the reactor as discussed previously. In general, we have found that it is necessary to maintain a reasonably constant linear gradient of temperature from a low of about 212° F. to about 300° F. at the beginning of the FEED ZONE to a maximum of about 350° F. to about 480° F. as the material exits from the EXTRUSION ZONE. The precise temperature gradient to be maintained in the case of any given reaction mixture can be determined by a process of trial and error.

It is to be noted that the behavior of the propulsion units in the reactor forms a very good means of checking whether the operation of the reactor is being conducted in the desired manner. Thus, when the viscosity of the reaction mixture is maintained substantially constant throughout the reactor, the load placed on the various sections of the screws, kneading elements and the like in the various ZONES will be equally distributed. When there is a wide variation in viscosity between various sections of the reactor, the load placed on the propulsion units will be greatly increased. Hence, by observing the load placed upon the propulsion unit (or units if each of the zones is powered independently), it is possible to check readily on any departure from the desired level of uniform viscosity. Further, having observed such a change, the location of the increase in viscosity can generally be detected by checking the temperatures of the various sections of the reactor.

The final stage of the progress of the reaction mixture through the continuous reactor in accordance with the process of the invention, is the passage through the EXTRUSION ZONE. The only critical condition required in this phase of the operation is the maintenance of constant viscosity, as discussed above. The conditions under which the extruder is operated are substantially those commonly employed in the art. There is nothing critical as to average residence time of the reaction mixture in the EXTRUSION ZONE, said residence time being governed solely by the actual capacity of the extruder.

The shaped reaction mixture which leaves the orifice, or orifices, of the extruder can be fed directly to an injection molding machine and can be pressure molded therein. Such a mode of operation avoids the intermediate step of cooling the extruded material and storing in some convenient form before remelting for injection molding purposes. More commonly, however, the reaction product obtained in the process of the invention is extruded from the EXTRUSION ZONE in the form of a strand which is subsequently cooled and chopped into pellets. Said cooling and chopping can be accomplished in a single operation by extruding the ribbon directly into a cooling fluid and subjecting the cooled strand to chopping using a blade mounted adjacent to the orifice of the extruder and adapted to cut the strand as it emerges from the orifice into the cooling fluid. This process is commonly known as die-face cutting.

Alternatively, the strand of material leaving the orifice of the extruder is conducted, advantageously by means of a moving belt, through a cooling chamber in which said ribbon is cooled by exposure to an inert gas such as nitrogen. The cooled strand is then fed directly to a pelletizer.

The organic diisocyanate employed in the process of the invention can be any of those commonly employed in the preparation of polyurethane elastomers. Illustrative of said diisocyanates are 2,4-tolylene diisocyanate, 2,6-tolylene diisocyanate, 4,4' - methylenebis(phenyl isocyanate), 3,3'-dimethyl-4,4'-diisocyanatodiphenyl, 3,3' - dimethoxy-4,4'-diisocyanatodiphenyl, 3,3'-dichloro-4,4'-diisocyanatodiphenyl, $\beta,\beta'$-diisocyanato-1,4-diethylbenzene, 1,5-naphthalene diisocyanate, 1,4-phenylene diisocyanate, and the like, including mixtures of two or more of the above diisocyanates. The preferred diisocyanate is 4,4'-methylenebis(phenyl isocyanate).

Any of the polymeric diols commonly employed in the preparation of polyurethane elastomers can be employed in the process of the invention. Such polyols generally have hydroxyl equivalents within the range of about 150 to about 2000 and include poly(alkylene ether) diols, polyester diols, lactone polyester diols, poly(esteramide) diols, and polyalkadiene diols, and mixtures thereof. The poly(alkylene ether) diols are prepared by polymerizing one or more cyclic ethers such as ethylene oxide, propylene oxide, dioxolane, tetrahydrofuran, and the like. The polyester diols are derived by condensing a dicarboxylic acid such as adipic acid with an excess of a dihydric alcohol such as ethylene glycol, propylene glycol, butylene glycol, or mixtures of two or more of said alcohols. The poly(esteramide) diols are prepared by condensing a dicarboxylic acid such as adipic acid with a hydroxylamine or a mixture of a diamine and a dihydric alcohol, the dihydric alcohol being present in excess so that the resulting polyester amide is hydroxy-terminated. The lactone polyester diols are prepared by polymerizing a lactone, preferably caprolactone, using the appropriate diol or hydroxylamine, such as ethanolamine, as an initiator. The polyalkadiene diols are prepared by methods well-known in the art; see, for example, U.S. 3,338,861. Examples of such diols are the adducts of a hydroxyl capping agent such as ethylene oxide, propylene oxide, butylene oxide, formaldehyde, and the like and (a) a homopolymer of a conjugated alkadiene, advantageously one containing from 4 to 8 carbon atoms such as butadiene, isoprene and the like, or (b) a copolymer of said conjugated alkadiene and a vinyl monomer such as acrylonitrile, methacrylonitrile, styrene and the like.

The above types of diols and the methods for their preparation are well described in the art; see, for example, Saunders, Polyurethanes, Chemistry and Technology, Part I, Interscience, New York, 1963; Bayer et al., Rubber Chemical and Technology, 23, 812 (1950) and U.S. Pat. 2,933,477.

Representative of the above types of diol are:

poly(oxypropylene) glycol
poly(oxyethylene) glycol
poly(oxyethyleneoxypropylene) glycol
poly(oxytetramethylene) glycol
poly(oxytrimethylene) glycol
poly(caprolactone) diol
poly(ethylene adipate) diol
poly(1,2-propylene adipate) diol
poly(propylene/ethylene adipate) diol
poly(1,4-butylene adipate) diol
poly(1,4-butylene/ethylene adipate) diol The difunctional active hydrogen containing extenders which are employed in the processes of the invention include: organic diamine, glycols, amino alcohols, hydroquinonebis-(2-hydroxyethyl)ether and the like. Examples of organic diamines are aliphatic primary diamines, such as ethylene diamine, trimethylene diamine, tetramethylene diamine, 1,3-butane diamine, cyclohexane diamine, di-(aminocyclohexyl)methane and the like: aromatic diamines such as paraphenylene diamine, methaphenylene diamine, benzidine, 4,4'-methylenedianiline and the like: and mixed aliphatic-aromatic diamines such as m-xylylene diamine, 1,4 - diethylbenzene-$\beta,\beta'$-diamine, 1,4-dipropylbenzene-$\gamma,\gamma'$-diamine and the like. The preferred diamines are the aliphatic diamines particularly ethylene diamine and trimethylene diamine. Examples of glycols which can be employed as chain extenders are aliphatic glycols such as ethylene glycol, trimethylene glycol, 1,4 - butanediol, 1,6-hexanediol, 1,8-octanediol and the like. Examples of amino alcohols which can be employed as chain extenders are ethanolamine, propanolamine, butanolamine and the like.

In addition to the main components of the polyurethane forming feed streams, as exemplified and discussed above, any of the conventional fillers, dyestuffs, pigments, flame retardants, stabilizing agents, antioxidants and the like, commonly employed in the preparation of noncellular thermoplastic polyurethanes can be incorporated into the polyurethanes prepared in accordance with the process of the invention. In general, such additives are incorporated by preblending the same with one or other of the feed streams, e.g. the polymeric diol, polyisocyanate or extender, prior to feeding said stream to the FEED ZONE in the process of the invention.

Further, the process of the invention can be adapted readily to the continuous production of blends of polyurethane with other polymers such as polyethylene, polypropylene, polyacrylonitrile, polybutadiene, neoprene, ethylene-propylene copolymers, ethylene-propylene terpolymers, copolymers of butadiene and acrylonitrile, copolymers of butadiene and methyl methacrylate, polyamides, polycarbonates and the like. Thus, one or more of the latter polymers can be fed, in molten condition, to an appropriate point in the sequence of operations involved in the process of the invention. The point of introduction of the polymer can be the entry port of the FEED ZONE in which case the polymer becomes incorporated into the initial polyurethane forming reaction mixture. Alternatively, the polymer can be introduced at a later point in the FEED ZONE or at any suitable point in the MIX ZONE consistent with there being an opportunity for adequate homogenization of the mixture prior to extrusion. Using the above aspect of the process of the invention, it is possible to produce blends which possess the characteristics of the particular polyurethane in question together with the characteristics of the second polymer or polymers introduced into the blend.

In addition to the obvious economic advantages, such as reduced labor costs, higher output, ease of manipulation etc. which flow from being able to carry out a process continuously as opposed to using a batch procedure, the process of the invention has the added advantage that it gives rise to a product which has markedly superior properties to a product derived from exactly the same reactants but which has been prepared by a batch procedure. Thus the products obtained in accordance with the process of the invention have markedly improved shelf life (stability on storage) and improved heat stability. In addition, they can be processed by injection molding techniques using higher processing temperatures than corresponding products made by a batch procedure. As will be appreciated by one skilled in the art, this means shorter demolding times of injection molded parts and hence higher output per machine.

Finally, the products derived in accordance with the process of the invention have complete homogeneity and reproducibility of physical properties. This is not true of corresponding products made in accordance with a batch procedure.

The following examples describe the manner and process of making and using the invention and set forth the best mode contemplated by the inventors of carrying out their invention but are not to be construed as limiting.

EXAMPLE 1

The apparatus employed in carrying out the process described in this example, was a twin-screw mixer-extruder combination. Each of the two shafts, mounted in parallel for co-rotation in the barrel of the mixer-extruder, was provided with a short worm screw section in the FEED ZONE, elliptical paddles having tips designed to provide a smearing action against the inner wall of the barrel and against the co-rotating shaft in the MIX ZONE, and worm screw sections in the EXTRUDER SECTION. The EXTRUDER SECTION was equipped with a die having 40 circular orifices, each of 3/16 in. diameter. The various sections of the mixer-extruder were heated and/or cooled independently and incrementally, by oil baths. The overall internal capacity of the mixer-extruder was 11 lbs. of polyurethane mix.

Three storage containers were employed. One storage container was charged with 4,4′-methylenebis(phenyl isocyanate) under nitrogen and the isocyanate was heated to 140° F. and maintained thereat with agitation throughout the run. A second storage tank was charged with a mixture of polytetramethylene ether glycol [N.W. 1000; Polymeg 1000], 1,4 - butanediol, 2,2′ - methylenebis(4-methyl-6-tertiarybutylphenol), dilauryl thiodipropionate, and stearic acid amide lubricant, the proportions by weight of 500:67.5:1.12:1.12:2.24 and the mixture was heated to 140° F. and maintained thereat with stirring. The third storage tank was charged with a 50 percent by weight solution of stannous octoate in di-octyl phthalate which was maintained at ambient temperature (circa 70° F.).

The isocyanate storage container and the polyol storage container were connected directly via metered pumps to the inlet port of the mixer extruder. The catalyst storage container was connected via a metered pump to the polyol feed line prior to its junction with the inlet port so that the catalyst feed was discharged into the polyol feed line and the mixture so obtained was fed to the inlet port.

In carrying out the continuous process of this example, the isocyanate, polyol mixture, and catalyst were pumped to the inlet port of the mixer-extruder at relative rates such that the NCO to OH (total) ratio was maintained at 1.05:1 (weight ratio of isocyanate to polyol mix equals 1:1.72) and the level of catalyst was maintained at 0.05 percent by weight of the total reaction mixture. The rate of feeding to the inlet port and thence through the mixer-extruder was such that the average residence time in each of the zones was as follows:

|  | Secs. |
|---|---|
| FEED ZONE | 10 |
| MIXER | 90 |
| EXTRUDER | 50 |

In the steady state of the run the following temperatures were recorded in the FEED ZONE and in the MIXER and EXTRUDER ZONES. The MIXER 1, 2, and 3 refers to temperatures recorded at the beginning, middle, and end of the MIXER ZONE. Similarly, EXTRUDER 1, 2, and 3 refers to temperatures recorded at the beginning, middle, and end of the EXTRUDER ZONE.

|  | ° F. |
|---|---|
| FEED ZONE | 200 |
| MIXERS: |  |
| 1 | 218 |
| 2 | 265 |
| 3 | 290 |
| EXTRUDERS: |  |
| 1 | 350 |
| 2 | 342 |
| 3 | 370 |
| DIE FACE | 420 |

The strands extruded from the DIE FACE were collected on a moving belt and cooled by passage through a tunnel in an atmosphere of nitrogen. The cooled strands were collected from the opposite end of the belt and were fed directly to a pelletizer to produce pellets. A representative sample of the pellets was molded into a test piece (4¾ x 4¾ x 0.070 inches) and submitted to physical test. The physical properties so determined were as follows:

| Hardness; Shore A (ASTM D–2240–68) | 83 |
|---|---|
| Modulus (ASTM D–412–68); p.s.i.: |  |
| 100% | 1040 |
| 300% | 4350 |
| Tensile strength; p.s.i. (ASTM D–412–68) | 5580 |
| Elongation at break; percent (ASTM D–412–68) | 340 |
| Tensile set at break; percent (ASTM D–412–68) | 9 |
| Tear strength; die C; p.l.i. (ASTM D–624–54) | 440 |
| Compression set; percent (ASTM D–395–67) | 58.9 |
| Abrasion resistance; mg. (Taber–H–22 wheel 1000 g/1000 rev.) | 26 |

EXAMPLE 2

The apparatus and procedure employed in Example 1 was used in this example also with the exception that the 1,4-butanediol extender employed in the reaction mixture in Example 1 was replaced by a mixture of the di(2-hydroxyethyl)ether of hydroquinone and tri(2-hydroxyethyl)ether of trimethylolpropane in such quantities that the proportion by weight of polytetramethyl ether glycol:hydroquinone di(2-hydroxyethyl)ether:trimethylol propane tri(2-hydroxyethyl)ether was 50.5:39.0:1.1.

The rate of feeding of reactants to the inlet port and thence through the mixer-extruder was such that the average residence time in each of the zones was as follows:

|  | Secs. |
|---|---|
| FEED ZONE | 10 |
| MIXER | 90 |
| EXTRUDER | 50 |

In the steady state of the run, the following temperatures were recorded in the FEED ZONE and in the MIXER and EXTRUDER ZONES. The significance of MIXER 1, 2, and 3 and EXTRUDER 1, 2, and 3 is the same as in Example 1.

|  | ° F. |
|---|---|
| FEED ZONE | 200 |
| MIXER: |  |
| 1 | 225 |
| 2 | 290 |
| 3 | 340 |
| EXTRUDER: |  |
| 1 | 410 |
| 2 | 398 |
| 3 | 430 |
| DIE FACE | 480 |

The physical properties of a test piece of elastomer injection molded from a typical sample of pellets from the above run had the following properties (test methods as set forth in Example 1):

| Hardness; Shore D | 55 |
|---|---|
| Modulus: |  |
| 100% | 2820 |
| 300% | 4710 |
| Tensile; p.s.i. | 5670 |
| Elongation at break; percent | 340 |
| Tensile set at break; percent | 20 |
| Tear strength; die C; p.l.i. | 760 |
| Compression set; percent | 35 |
| Abrasion resistance; mg. | 67.5 |

EXAMPLE 3

The apparatus and procedure employed in this example were exactly the same as described in Example 1 with the exception that the polytetramethylene ether glycol there used was replaced by a polycaprolactone ester of molecular weight 2000 (prepared from the caprolactone initiated with 1,4-butanediol). The proportions by weight of polycaprolactone ester to 1,4-butanediol extender in the polyol mixture were 7.4:1.

The rate of feeding of reactants to the inlet port and thence through the mixer-extruder was such that the average residence time in each of the zones was as follows:

|  | Secs. |
|---|---|
| FEED ZONE | 10 |
| MIXER | 90 |
| EXTRUDER | 50 |

In the steady state of the run, the following temperatures were recorded in the FEED ZONE, the MIXER ZONE and the EXTRUDER ZONE. The significance of the positions 1, 2, and 3 in the latter two zones is the same as in Example 1.

|  | °F. |
|---|---|
| FEED ZONE | 200 |
| MIXERS: | |
| 1 | 212 |
| 2 | 245 |
| 3 | 275 |
| EXTRUDERS: | |
| 1 | 325 |
| 2 | 330 |
| 3 | 350 |
| DIE FACE | 410 |

The physical properties of a test piece of elastomer, injection molded from a typical sample of pellets from the above run had the following properties (test methods as set forth in Example 1):

| | |
|---|---|
| Hardness; Shore A | 85 |
| Modulus: | |
| 100% | 950 |
| 300% | 1820 |
| Tensile; p.s.i. | 8250 |
| Elongation at break; percent | 480 |
| Tensile set at break | 10 |
| Tear strength; die C; p.l.i. | 510 |
| Compression set; percent | 52 |
| Abrasion resistance; mg. | 4 |

EXAMPLE 4

The reactants and proportions thereof employed in this example were exactly the same as those employed in Example 1 but the apparatus was different and was as follows. The mixer-extruder comprised five identical sections assembled in series. Each section was provided with twin shafts mounted in parallel along the longitudinal axis thereof; each shaft had a screw section followed by triangular shaped paddles mounted thereon so that each apex provided a smearing action against the inner wall of the barrel and against the co-rotating parallel shaft. In the beginning of the first of the five sections, an entry port was provided and reactants were delivered thereto as in Example 1. The last of the five sections led directly to an extruding die of the same design as that employed in Example 1. Each of the sections of the mixer-extruder was provided with means for heating incrementally. The overall capacity of the mixer-extruder was approximately 4 lbs. of polyurethane mix.

The rate of feeding reactants was adjusted so that the average residence time of reaction mixture in the apparatus was 40 seconds.

The strands extruded from the die orifices were collected on a moving belt and cooled and pelletized as described in Example 1. The temperature of the reaction mixture was recorded in each section in the mixer-extruder and, in the steady state, the overall picture of temperature of mix in the extruder was as follows.

| | Reaction mix temp. °F. |
|---|---|
| Inlet port | 200 |
| Sections: | |
| 1 | 410 |
| 2 | 410 |
| 3 | 446 |
| 4 | 431 |
| 5 | 401 |

What is claimed is:

1. In a continuous process for the one-shot preparation of a thermoplastic noncellular polyurethane the steps comprising:
(a) admixing in the liquid state in a first zone an organic diisocyanate, a polymeric diol, a difunctional extender, and a catalyst, the overall ratio of isocyanate to active hydrogen groups in said reactants being within the range of about 0.9:1 to about 1.2:1, and the molar proportion of polymeric diol to difunctional extender being within the range of about 0.1:1 to about 10:1;
(b) continuously passing reaction mixture from said first zone through a second zone interconnecting therewith in which second zone said reaction mixture is subjected to high shear mixing;
(c) continuously passing reaction mixture from said second zone to a third shaping zone interconnecting therewith in which shaping zone said mixture is shaped by extrusion; and
(d) controlling the temperature of said reaction mixture incrementally during its passage through each of said interconnecting zones said temperature increasing in substantially linear gradient from the entrance to said first zone to the exit of said shaping zone so that the viscosity of said reaction mixture remains substantially constant through said second and third zones and falls within the range of about 100,000 cps. to about 1,000,000 cps.

2. The process of claim 1 wherein said thermoplastic noncellular polyurethane is extruded as a strand, said strand is cooled to a solid state in an inert atmosphere, and said solid strand is pelletized.

3. The process of claim 1 wherein said polyurethane is extruded as a strand into a cooling liquid and is pelletized by die-face cutting.

4. The process of claim 1 wherein the temperature at which the reaction components are brought together in said first zone is within the range of about 85° F. to about 260° F., the temperature at which the reaction mixture exits from said shaping zone is within the range of about 350° F. to about 480° F. and the temperature gradient from the entrance to said first zone to the exit of said shaping zone is substantially linear.

5. The process of claim 1 wherein the average residence time in said first zone is from about 1 second to about 6 seconds and the average residence time in said second zone is from about 6 seconds to about 50 seconds.

6. The process of claim 1 wherein the polyurethane reaction mixture is catalyzed so that no significant reaction occurs until the reaction mixture has entered said second zone and the reaction is substantially complete before said mixture exits from said second zone.

7. The process of claim 1 wherein the polyurethane reactants are brought together simultaneously in said first zone.

8. The process of claim 1 wherein the polyisocyanate, polymeric diol and catalyst are brought together at the beginning of said first zone and the extender is incorporated into the reaction mixture at a subsequent stage in the process of the reaction.

References Cited

UNITED STATES PATENTS

| | | | |
|---|---|---|---|
| 2,764,565 | 9/1956 | Hoppe et al. | 260—75 |
| 2,915,299 | 12/1959 | Woebcke | 260—75 |
| 3,170,972 | 2/1965 | Knipp et al. | 264—176 |
| 3,192,185 | 6/1965 | Achterhof et al. | 264—176 |
| 3,233,025 | 2/1966 | Frye et al. | 264—176 |

ROBERT F. WHITE, Primary Examiner

J. R. THURLOW, Assistant Examiner

U.S. Cl. X.R.

26—75 TN, 77.5 AX; 264—143, 176, 331